(12) United States Patent
Honda et al.

(10) Patent No.: US 9,399,499 B2
(45) Date of Patent: Jul. 26, 2016

(54) BICYCLE BATTERY HOLDER

(75) Inventors: Kazuki Honda, Osaka (JP); Hiroshi Tachibana, Osaka (JP); Hideki Chouji, Osaka (JP)

(73) Assignee: Shimano Inc., Osaka (JP)

( * ) Notice: Subject to any disclaimer, the term of this patent is extended or adjusted under 35 U.S.C. 154(b) by 1310 days.

(21) Appl. No.: 13/171,679

(22) Filed: Jun. 29, 2011

(65) Prior Publication Data

US 2013/0004818 A1 Jan. 3, 2013

(51) Int. Cl.
*B62M 6/90* (2010.01)
*H01M 2/10* (2006.01)

(52) U.S. Cl.
CPC .............. *B62M 6/90* (2013.01); *H01M 2/1083* (2013.01); *H01M 2220/20* (2013.01)

(58) Field of Classification Search
CPC ............................... H01M 2/1083; B62M 6/90
See application file for complete search history.

(56) References Cited

U.S. PATENT DOCUMENTS

| | | | |
|---|---|---|---|
| 675,390 A | 6/1901 | Keating | |
| 1,439,430 A | 12/1922 | Lyhne | |
| 4,339,060 A | 7/1982 | Braida, Jr. | |
| 5,217,824 A | 6/1993 | Womack | |
| 5,378,553 A | 1/1995 | Shoji | |
| 6,095,270 A | 8/2000 | Ishikawa | |
| 6,230,834 B1 | 5/2001 | Van Hout et al. | |
| 6,423,443 B1 * | 7/2002 | Tsuboi et al. | 429/98 |
| 6,669,220 B2 | 12/2003 | Meggiolan | |
| 6,896,277 B2 | 5/2005 | Meggiolan | |
| 7,100,932 B2 | 9/2006 | Meggiolan | |
| 7,267,352 B2 | 9/2007 | Ishikawa | |
| 7,654,550 B2 | 2/2010 | Chuang | |
| 7,726,427 B2 | 6/2010 | Picavet | |
| 2005/0156001 A1 | 7/2005 | Dal Pra et al. | |
| 2007/0000388 A1 | 1/2007 | Huang et al. | |
| 2009/0261134 A1 * | 10/2009 | Tetsuka et al. | 224/412 |

FOREIGN PATENT DOCUMENTS

| | | |
|---|---|---|
| DE | 202005018897 U1 | 3/2006 |
| EP | 1 911 666 A1 | 4/2008 |
| JP | 5689789 U | 7/1981 |
| JP | 10-40890 A | 2/1998 |
| JP | 11129959 A | 5/1999 |
| JP | 2001106136 A | 4/2001 |
| TW | M312485 | 5/2007 |

OTHER PUBLICATIONS

European Search Report of corresponding EP Application No. 11 19 3254.7 dated Nov. 7, 2012.

* cited by examiner

*Primary Examiner* — Maria J Laios
(74) *Attorney, Agent, or Firm* — Global IP Counselors

(57) ABSTRACT

A bicycle battery holder is basically provided with a battery holder body, an operating member and a battery engaging member. The battery holder body includes a contact portion. The operating member is movably mounted to the battery holder body between a first position and a second position. The battery engaging member is pivotally coupled to the operating member on an axle such that the battery engaging member moves in a first direction with respect to the battery holder body to a battery retaining position as the operating member moves from the first position to the second position. The contact portion of the battery holder body limits rotational movement of the operating member around an axis of the axle to maintain the operating member in the first position while the operating member is disposed in the first position.

18 Claims, 12 Drawing Sheets

US 9,399,499 B2

BICYCLE BATTERY HOLDER

BACKGROUND

1. Field of the Invention

This invention generally relates to a bicycle battery holder. More specifically, the present invention relates to a bicycle battery holder that has an operating member to install.

2. Background Information

Recently, bicycles have been equipped with electrical components to make riding easier and more enjoyable for the rider. Some bicycles are equipped with electrically controlled shifting systems. Such systems require electricity from a power source, such as a wheel hub generator and/or a battery. In cases where a battery is used as a power source, a mounting structure must be provided to attach the battery to the bicycle frame. Preferably, the mounting structure is configured such that the battery can be easily installed. One example of a battery holder is disclosed in U.S. Pat. No. 7,267,352 in which a stopper assembly is used to retain a battery unit on the mounting unit, which is attached to a seat tube of the bicycle frame. Another example of a battery holder is disclosed in U.S. Pat. No. 6,669,220 in which an integrated control and power unit has a battery holder which is attached to a down tube of the bicycle frame. While the battery holders of both of these patents work well, they have certain drawbacks. For example, in U.S. Pat. No. 7,267,352, the stopper assembly can be difficult for some riders to operate with one hand. The battery holder of U.S. Pat. No. 6,669,220 is merely held in place by a press fit such that the battery may accidentally fall out while riding over rough terrain. Other examples of battery holders for bicycles are disclosed in U.S. Pat. No. 6,896,277 and U.S. Patent Application Publication Nos. 2005/0156001 and 2009/0261134.

SUMMARY

One aspect of this disclosure is to provide a bicycle battery holder in which the battery can be manufactured with relatively few parts.

The foregoing objects can basically be attained by providing a bicycle battery holder for retaining a battery in which the bicycle battery holder basically comprises a battery holder body, an operating member and a battery engaging member. The battery holder body includes a contact portion. The operating member is movably mounted to the battery holder body between a first position and a second position. The battery engaging member is pivotally coupled to the operating member on an axle such that the battery engaging member moves in a first direction with respect to the battery holder body to a battery retaining position as the operating member moves from the first position to the second position. The contact portion of the battery holder body limits rotational movement of the operating member around an axis of the axle to maintain the operating member in the first position while the operating member is disposed in the first position.

These and other objects, features, aspects and advantages of the bicycle battery holder will become apparent to those skilled in the art from the following detailed description, which, taken in conjunction with the annexed drawings, discloses two illustrative embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
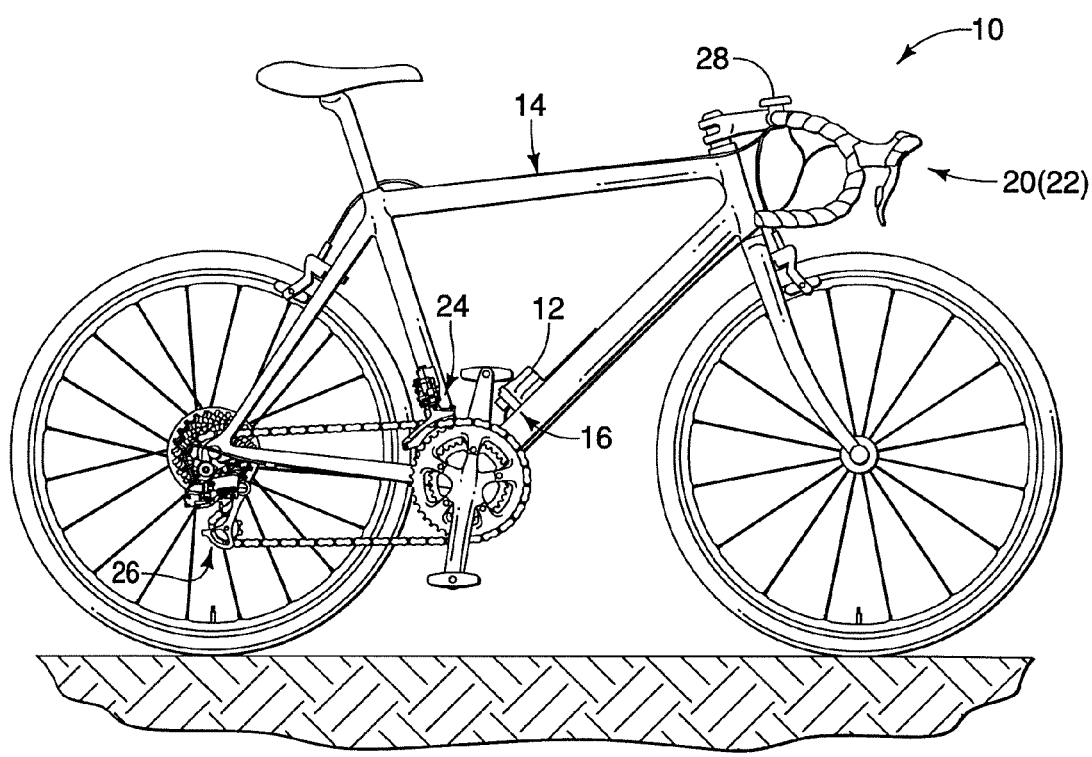
FIG. 1 is a side elevational view of a bicycle having an electrically controlled shifting system in which a battery is mounted to a bicycle frame using a bicycle battery holder in accordance with a first embodiment.
Figure 2:
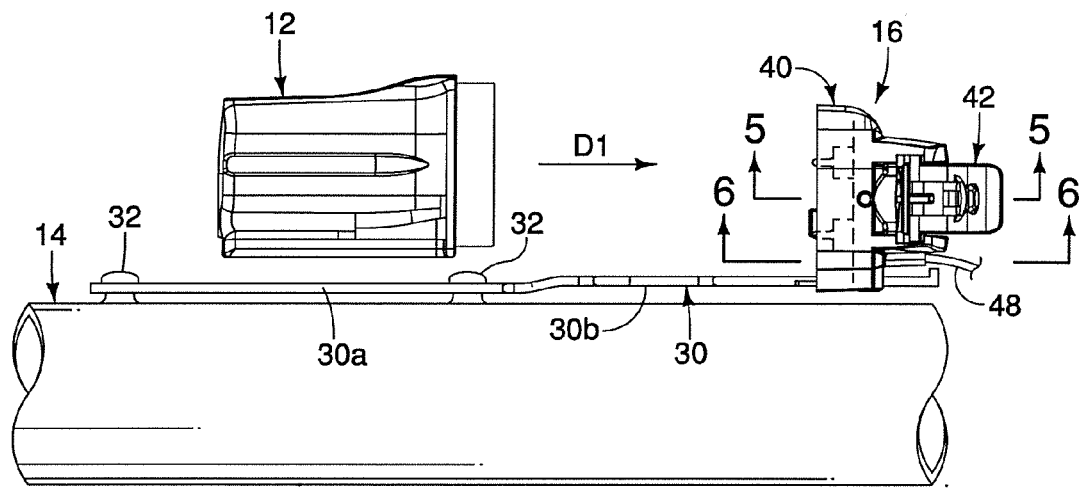
FIG. 2 is a side elevational view of the bicycle battery holder illustrated in FIG. 1 with the battery holder body mounted to the down tube of the bicycle frame and the battery being inserted into the bicycle battery holder.
Figure 3:
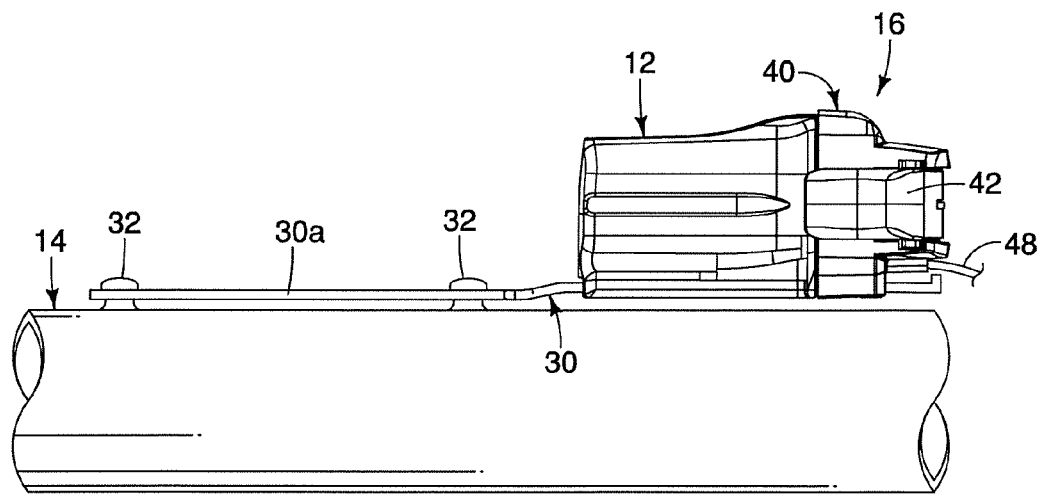
FIG. 3 is a partial side elevational view, similar to FIG. 2, of the bicycle battery holder illustrated in FIG. 1 with the battery holder body mounted to the down tube of the bicycle frame and the battery in a fully seated position.

Referring initially to FIGS. 1 to 3, a bicycle 10 is illustrated that is equipped with an electrically controlled shifting system in which a battery 12 is mounted to a bicycle frame 14 using a bicycle battery holder 16 in accordance with one embodiment. As best seen in FIGS. 2 and 3, the bicycle battery holder 16 is fixedly coupled to the bicycle frame 14 of the bicycle 10 with the battery 12 being easily removed from and reattached to the bicycle battery holder 16 as explained below. The battery 12 is a replaceable battery pack. Alternatively, the battery 12 can be a rechargeable battery that is rechargeable by the electricity generating device mounted to the bicycle 10. Since batteries are conventional electronic components, further description of the battery 12 is omitted for the sake of brevity.

Basically, as seen in FIG. 1, the electrically controlled shifting system includes a pair of electric shifters 20 and 22, a front motorized derailleur 24, a rear motorized derailleur 26 and a cycle computer 28. The electric shifters 20 and 22 be electronically control the motorized derailleurs 24 and 26 to move a chain between front and rear chain sprockets of the bicycle 10, respectively, in a conventional manner. Specifically, control signals from the electric shifters 20 and 22 are transmitted to electric motor units (not shown) in each of the motorized derailleurs 24 and 26 such that a chain guide moves the chain in a conventional manner to the selected chain sprocket. Since the electric motor units of the motorized derailleurs 24 and 26 are electrically powered, a power source is necessary to operate them. Thus, the battery 12 supplies electrical power to at least motor units (not shown) of the motorized derailleurs 24 and 26. Since electric shifters, motorized derailleurs and cycle computers are well known in the bicycle art, the electric shifters 20 and 22, the motorized derailleurs 24 and 26 and the cycle computer 28 will not be discussed or illustrated in detail herein.

Referring now to FIGS. 2 and 3, in the illustrated embodiment, the bicycle battery holder 16 is mounted to the bicycle frame 14 using a stationary mounting structure or rail 30. The mounting rail 30 is a hard rigid member constructed of a lightweight material such as aluminum or any other suitable material. The mounting rail 30 is fixedly coupled to the down tube of the bicycle frame 14 by a pair of mounting bolts 32 at the anchoring points that are typically used for attaching a bottle cage to the down tube of the bicycle frame 14. Of course, the bicycle battery holder 16 can be mounted in other locations and/or other with other types of mounting arrangements. The mounting rail 30 is a one-piece, unitary member that can basically be divided into a frame attachment section 30a and a bracket connecting section 30b. The frame attachment section 30a has a plurality of mounting holes for receiving the mounting bolts 32 in two of the mounting holes to fix the mounting rail 30 to the bicycle frame 14. The bicycle battery holder 16 is fixed to a free end portion of the bracket connecting section 30b that is spaced from the frame attachment section 30a. The bracket connecting section 30b is shaped to support the battery 12. In particular, the battery 12 is fixedly coupled to the bracket connecting section 30b by sliding movement of the battery 12 in a first movement direction D1 with respect to the bicycle battery holder 16 in a conventional manner.

Figure 4:
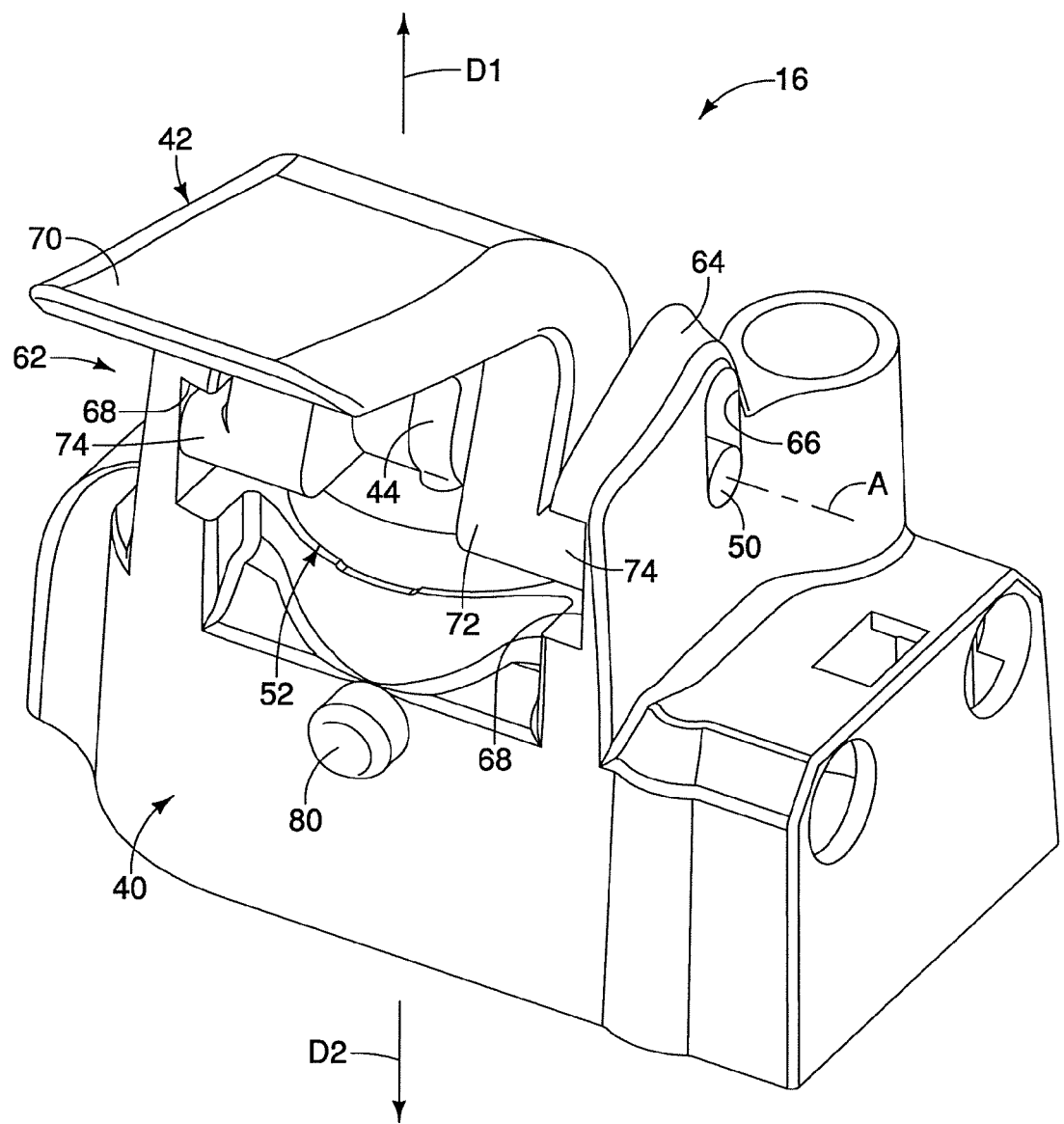
FIG. 4 is a perspective view of the bicycle battery holder illustrated in FIGS. 1 to 3.
Figure 5:
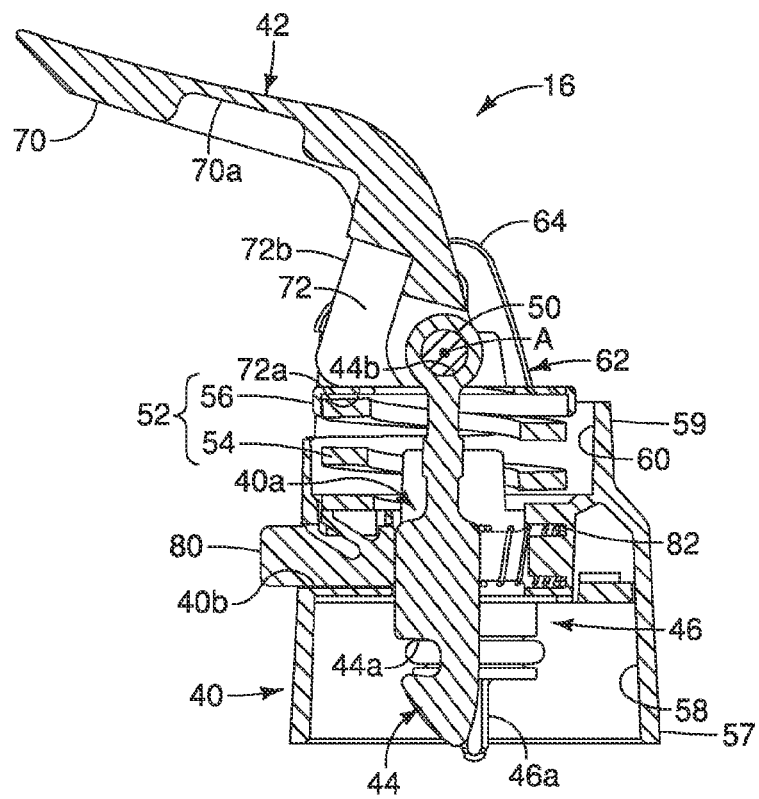
FIG. 5 is a cross sectional view of the bicycle battery holder illustrated in FIG. 4 as seen along the line 5-5 in FIG. 3, showing the bicycle battery holder in a battery receiving position.
Figure 6:
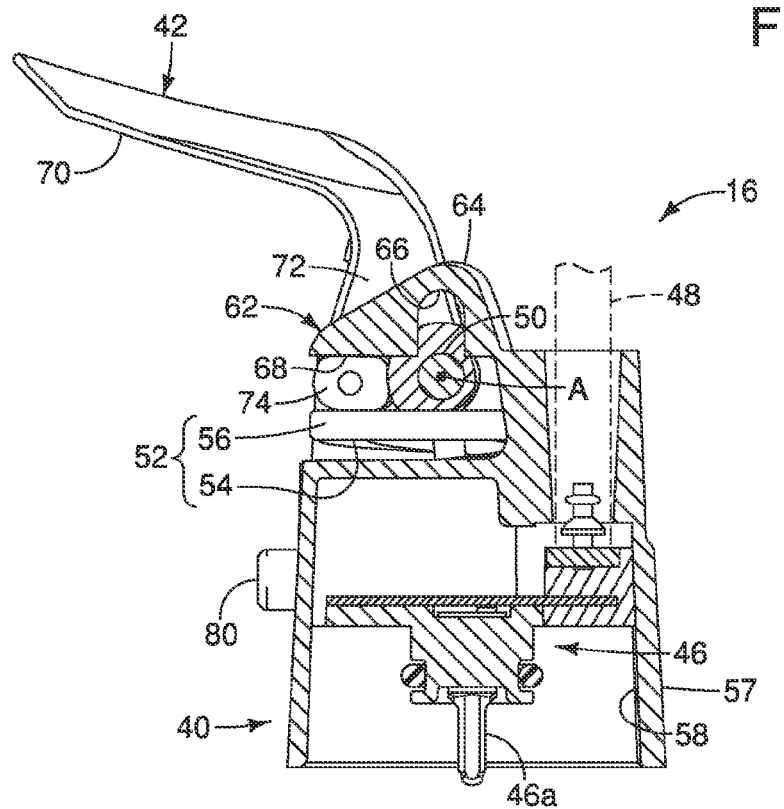
FIG. 6 is a cross sectional view of the bicycle battery holder illustrated in FIG. 4 as seen along the line 6-6 in FIG. 3, showing the bicycle battery holder in a battery receiving position.

Referring now to FIGS. 4 to 7, in the illustrated embodiment, the bicycle battery holder 16 basically includes a battery holder body 40, an operating member 42 and a battery engaging member 44. The battery holder body 40 is provided with an electrical connector 46 that is configured to mate with electrical terminal or contacts (not shown) of the battery 12 for receiving electricity from the battery 12. The illustrated embodiment, the electrical connector 46 has two electrical terminal or contacts 46a for receiving electricity from the battery 12. The electrical connector 46 is connected to an electrical supply wire 48 for supplying electricity from the battery 12 to one or more electrical components (e.g., the electric shifters 20 and 22 and the motorized derailleurs 24 and 26) of the bicycle 10. In the illustrated embodiment, the electrical connector 46 basically includes a terminal block having the electrical (terminals) contacts 46a that are electrically connected to an electrical supply wire 48 via a male connector as seen in FIG. 6. The electrical contacts of the electrical connector 46 extend from the terminal block in a direction generally parallel to one another and parallel to the first movement direction D1. The electrical contacts are each electrically connected to one electrical conductor of the electrical wire 48 to transfer electrical power from the battery 12 to the derailleurs 24 and 26. Thus, the electrical connector 46 constitutes an electrical contact structure of the bicycle battery holder 16 for transferring electricity from the battery to an electrical component via the electrical supply wire 48. Since the precise construction of the electrical connector 46 will vary depending on the configuration of the battery 12, the electrical connector 46 will not be discussed in detail herein.

In the illustrated embodiment, the operating member 42 is movably mounted to the battery holder body 40 between a first position and a second position. In the first position, the operating member 42 positions the battery engaging member 44 relative to the battery holder body 40 such that the battery 12 can be attached to the battery holder body 40 or removed from the battery holder body 40. In the second position, the operating member 42 positions the battery engaging member 44 relative to the battery holder body 40 such that the battery 12 is fixed to the battery holder body 40. In particular, the operating member 42 is movably attached to the battery holder body 40 by an axle 50. The battery engaging member 44 is pivotally coupled to the operating member 42 on the axle 50 such that the battery engaging member 44 moves in the first movement direction D1 with respect to the battery holder body 40 to a battery retaining position as the operating member 42 moves from the first position to the second position. With this arrangement, the battery engaging member 44 pulls the battery 12 into engagement with the electrical connector 46 of the battery holder body 40 as the operating member 42 moves from the first position to the second position as discussed below.

Still referring now to FIGS. 4 to 7, in the illustrated embodiment, the bicycle battery holder 16 further includes a biasing member 52 that is disposed between the battery holder body 40 and the operating member 42. The biasing member 52 biases the operating member 42 to remain in the first position while the operating member 42 is disposed in the first position. Also the biasing member 52 biases the operating member 42 to remain in the second position while the operating member 42 is disposed in the second position. In the illustrated embodiment, the biasing member 52 is formed by a compression spring 54 and a spring holder or cap 56. The spring holder 56 is disposed on the compression spring 54 such that spring holder 56 contacts the operating member 42. The spring holder 56 is a rigid cap shaped member with a hole through the end surface so that the battery engaging member 44 can pass therethrough. The spring holder 56 covers one end of the compression spring 54 and acts as a contact surface for the operating member 42. The compression spring 54 is a compression spring which disposed between the spring holder 56 and an end surface of the battery holder body 40. The spring holder 56 and the compression spring 54 cooperate together to operatively transmit an urging force between the battery holder body 40 and the operating member 42.

Now the battery holder body 40 will be discussed in more detail. The battery holder body 40 is configured to be fixedly coupled to the bicycle frame 14 by the mounting rail 30 as mentioned above. The battery holder body 40 is a hard rigid member constructed of a lightweight material such as hard plastic or any other suitable material. The battery holder body 40 includes a battery receiving portion 57 defining a battery receiving recess 58 at a first end, and a biasing member receiving portion 59 defining a biasing member receiving recess 60 at a second end. A center opening 40*a* interconnects the battery receiving recess 58 and the biasing member receiving recess 60. The battery receiving recess 58 is configured to mates with one end of the battery 12 when the battery 12 is slid along the mounting rail 30. The electrical terminals of the electrical connector 46 are exposed in the battery receiving recess 58 for electrically coupling with mating terminals of the battery 12 when the battery 12 is retained in a fully retained state to the battery holder body 40. The biasing member receiving recess 60 receives a first end of the compression spring 54.

The battery engaging member 44 is a hard rigid member that is preferably formed of a lightweight metal material such as aluminum and/or hard plastic. Basically, the battery engaging member 44 is coupled to the operating member 42 by the axle 50 for movement in the first and second movement directions D1 and D2. The battery engaging member 44 passes through the center opening 40*a* such that a first portion of the battery engaging member 44 is located in the battery receiving recess 58 and a second portion of the battery engaging member 44 is located in the biasing member receiving recess 60. More specifically, the battery engaging member 44 has a cutout that forms a hook 44*a*. The hook 44*a* is arranged in the battery receiving recess 58 to engage a latch portion 12*a* (e.g., a hook receiving recess) of the battery 12. The battery engaging member 44 has an attachment end 44*b* with an opening that receives the axle 50. Thus, the battery engaging member 44 is pivotally attached to the operating member 42 by the axle 50. With this arrangement, the hook 44*a* of the battery engaging member 44 is disposed on a first side of the electrical connector 46, while the end of the battery engaging member 44 with the attachment end 44*b* is located on a second side of the electrical connector 46 with respect to the first movement direction D1. As a result, the hook 44*a* of the battery engaging member 44 moves toward the electrical connector 46 as the operating member 42 is moved from the first position to the second position. Also, the battery engaging member 44 is movably mounted with respect to the battery holder body 40 to move in a transverse direction with respect to the first movement direction D1 such that the hook 44 *a* engages the latch portion 12*a* of the battery 12. In particular, the hook 44*a* is arranged with respect to the operating member 42 such that the hook 44*a* engages the latch portion 12*a* of the battery 12 prior to the operating member 42 being moved to the second position as discussed below.

Figure 7:
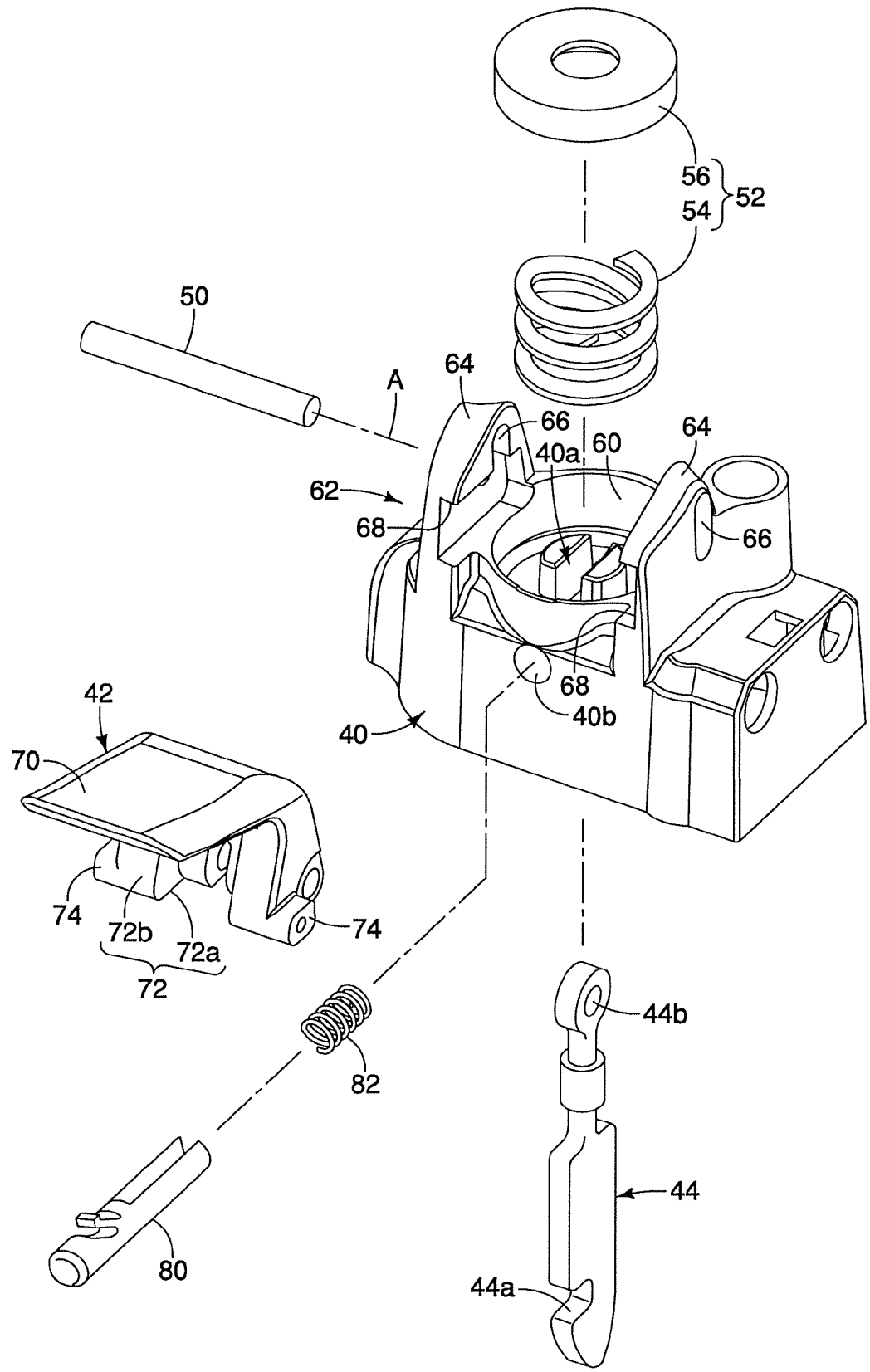
FIG. 7 is an exploded perspective view of the bicycle battery holder illustrated in FIGS. 5 to 7.

As best seen in FIGS. 4 and 7, the battery holder body 40 further includes a contact portion 62 that includes a pair of flanges 64 for movably mounting both the operating member 42 and the battery engaging member 44 to battery holder body 40 via the axle 50. The flanges 64 of the contact portion 62 of the battery holder body 40 limit movement of the operating member 42 in the first direction while the operating member 42 is disposed in the first position. In particular, each of the flanges 64 includes a mounting slot 66 for receiving the axle 50 and a pair of control slots 68 for receiving the operating member 42 as discussed below. The biasing member 52 biases the operating member 42 towards the contact portion 62 (i.e., against surfaces of the control slots 68) at least while the operating member 42 is disposed in the first position.

The mounting slots 66 extend in parallel to a battery installation direction that corresponds to the first movement direction D1 in the illustrated embodiment. Thus, the axle 50 is movably mounted relative to the battery holder body 40 in the first movement direction D1 during installation of the battery 12 as a result of the operating member 42 being moved from the first position to the second position. On the other hand, the axle 50 moves relative to the battery holder body 40 in a second movement direction D2 during removal of the battery 12 as a result of the operating member 42 being moved from the second position to the first position. Since the battery engaging member 44 is mounted to the operating member 42 by the axle 50, the battery engaging member 44 also moves in the first movement direction D1 during installation of the battery 12 and moves in the second movement direction D2 during removal of the battery 12.

The control slots 68 of the contact portion 62 limits rotational movement of the operating member 42 around an axis A of the axle 50 to maintain the operating member 42 in the first position while the operating member 42 is disposed in the first position. The control slots 68 of the contact portion 62 also limits movement of the operating member 42 in the first direction while the operating member 42 is disposed in the second position.

Now the operating member 42 will be discussed in more detail. The operating member 42 includes a lever portion 70, a cam portion 72 and a pair of protrusions 74. In the illustrated embodiment, the lever portion 70, the cam portion 72 and the protrusions 74 are formed as a one-piece, unitary member from a suitable rigid material. Basically, by the user moving the lever portion 70 of the operating member 42, the operating member 42 pivots relative to the battery holder body 40 on the axle 50. The operating member 42 is movable between the first position (see FIGS. 8 to 11) and the second position (see FIGS. 16 and 17). The first position is basically an open or unlatched position. In the first position, the battery 12 can be initially latched to the battery engaging member 44 without an electrical connection being made. Also in the first position, the battery 12 can be release from the battery holder body 40. On the other hand, while in the second position, the battery 12 is basically locked or latched to the battery holder body 40 with an electrical connection being formed between the battery and the electrical connector 46 in the battery holder body 40. Thus, the battery 12 can be retained on the battery holder body 40 when the operating member 42 is in either the first position or the second position.

The cam portion 72 of the operating member 42 is operatively engaged with the biasing member 52 to selectively maintain the operating member 42 in the first and second positions. In particular, the compress the compression spring 54 is arranged between the battery holder body 40 and the cam portion 72 of the operating member 42 such that the compression spring 54 is compressed by the cam portion 72 as the operating member 42 moves from the first position to the second position. As a result of the operating member 42 moving from the first position to the second position, the hook 44a of the battery engaging member 44 moves in the first movement direction D1. On the other hand, the compression spring 54 expands and the hook 44a of the battery engaging member 44 moves in the second movement direction D2 as the operating member 42 moves from the second position to the first position.

In the illustrated embodiment, the cam portion 72 of the operating member 42 includes a first contact surface 72a and a second contact surface 72b. The first and second contact surfaces 72a and 72b selectively contacts the spring holder 56 of the biasing member 52 depending on the position of the operating member 42. In particular, the first contact surface 72a contacts the biasing member 52 while the cam portion 72 of the operating member 42 is disposed in the first position. On the other hand, the second contact surface 72b which contacts the biasing member 52 while the operating member 42 is disposed in the second position. In the illustrated embodiment, the first and second contact surfaces 72a and 72b are divided into separate halves by a space that receives the battery engaging member 44. Thus, the first and second contact surfaces 72a and 72b of the operating member 42 form the cam portion 72 of the operating member 42. The compression spring 54 has a first end pushing against the battery holder body 40 and a second end pushing the spring holder 56 against either the first contact surface 72a or the second contact surface 72b of the operating member 42 depending on the position of the cam portion 72 of the operating member 42. Thus, the operating member 42 is held in the first and second positions by the urging force of the compression spring 54 pressing the spring holder 56 against either the first contact surface 72a or the second contact surface 72b of the cam portion 72.

Figure 8:
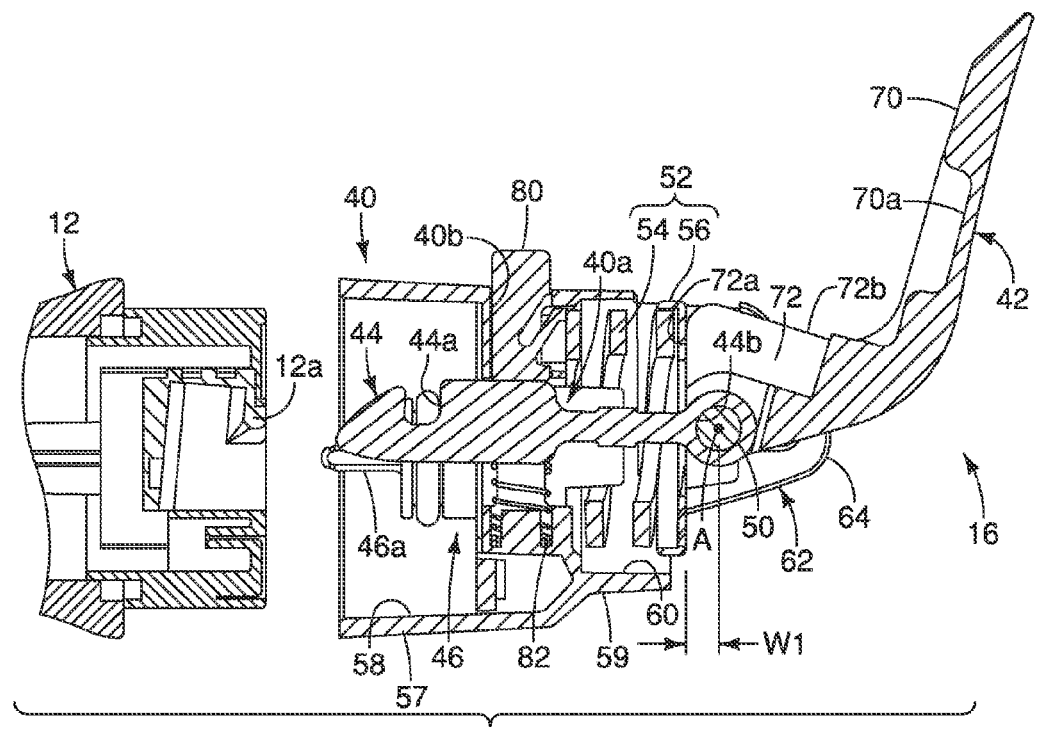
FIG. 8 is a cross sectional view, similar to FIG. 5, of the bicycle battery holder, but also showing a portion of the battery in a position just prior to attachment of the battery to the bicycle battery holder.
Figure 9:
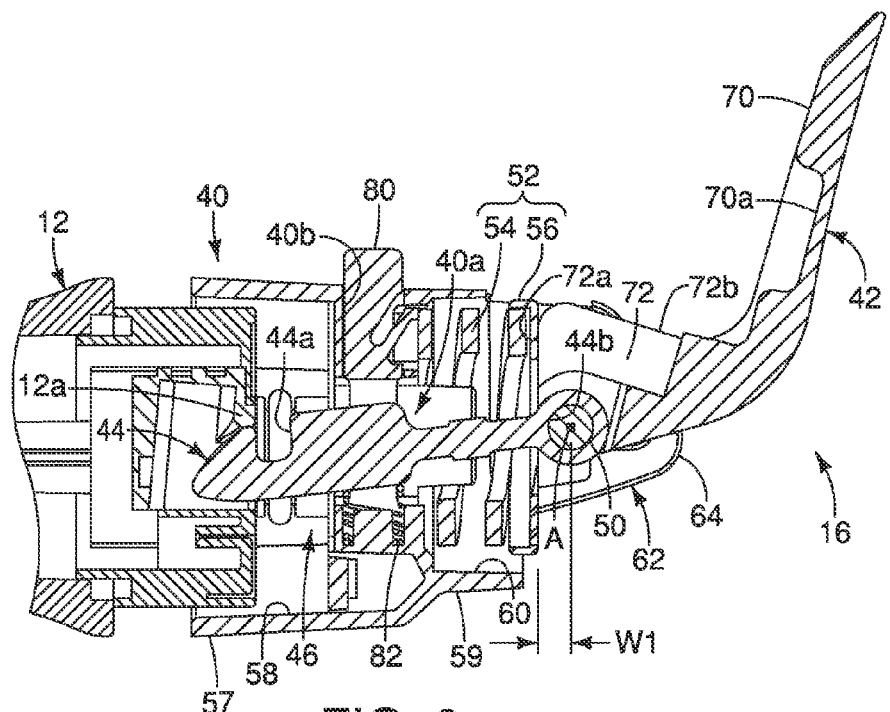
FIG. 9 is a cross sectional view, similar to FIG. 8, of the bicycle battery holder and a portion of the battery, but showing the battery moving the battery engaging member of the bicycle battery holder as the battery is being initially inserted into the bicycle battery holder.
Figure 16:
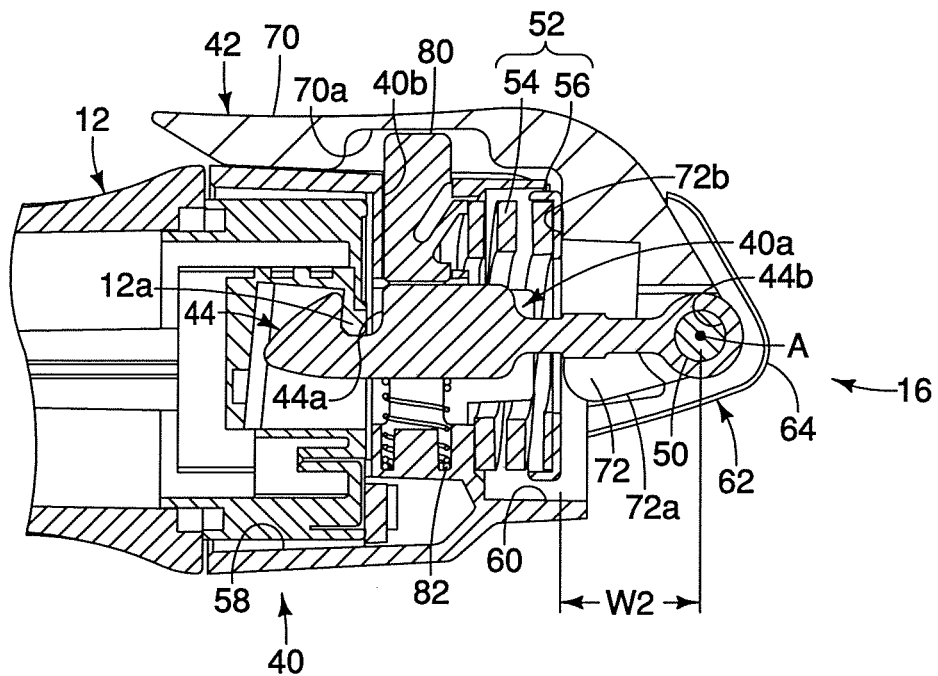
FIG. 16 is a cross sectional view, similar to FIGS. 8 to 10, 12 and 14, of the bicycle battery holder and the portion of the battery, but showing the battery moved further into the bicycle battery holder from the position in FIGS. 14 and 15 to the engaged position.
Figure 17:
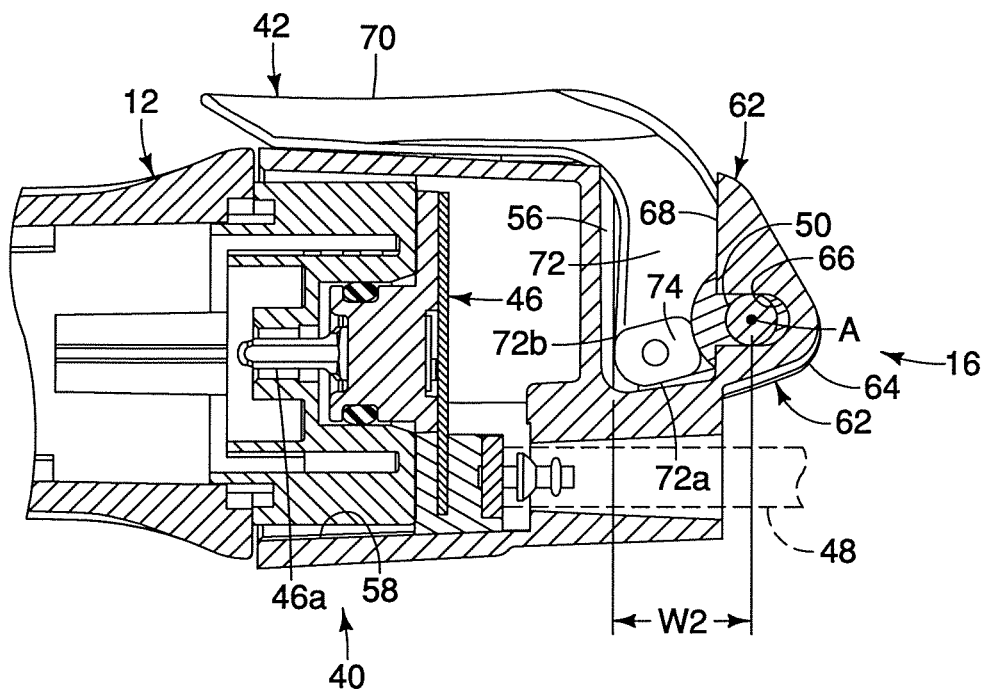
FIG. 17 is a cross sectional view, similar to FIG. 15, of the bicycle battery holder and the portion of the battery, but showing the battery in the fully engaged position similar to FIG. 16.

As best seen in FIGS. 8 to 17, the first and second contact surfaces 72a and 72b of the cam portion 72 are spaced at different distances from the axis A of the axle 50 with respect to the first and second directions D1 and D2. In other words, the first contact surface 72a is spaced from the axis A of the axle 50 by a first distance W1 when the operating member is in the first position as seen in FIGS. 8 and 9, while the second contact surface 72b of the operating member 42 is spaced from the axis A of the axle 50 by a second distance when the operating member is in the second position as seen in FIGS. 16 and 17. The second distance W2 is larger than the first distance W1. As a result of this arrangement of the contact surfaces 72a and 72b, rotation of the operating member 42 from the first position to the second position causes the battery engaging member 44 to move in the first movement direction D1. On the other hand, rotation of the operating member 42 from the second position to the first position causes the battery engaging member 44 to move in the second movement direction D2.

The protrusions 74 are disposed in the control slots 68 of the contact portion 62 of the battery holder body 40. With the protrusions 74 disposed in the control slots 68, the cam portion 72 is in contact with the biasing member 52 such that the biasing member 52 biases the cam portion 72 of the operating member 42 in the first movement direction D1. Thus, the protrusions 74 are pressed against sides of the control slots 68 by the biasing member 52 to maintain the position of the operating member 42 as explained below.

The protrusions 74 project in opposite directions to form an abutment of the operating member 42 that contacts the contact portion 62. The protrusions 74 (i.e., the abutment) are offset from the axis A of the axle 50. The protrusions 74 restrict movement of the operating member 42 in the first direction by the protrusions 74 contacting the contact portion 62 of the battery holder body 40. The protrusions 74 are spaced from the axis A of the axle 50 in the second movement direction while the operating member 42 is in the second position.

Referring now to FIGS. 4, 5 and 7, the battery holder body 40 further includes a release button 80 and a return spring 82. The release button 80 and the return spring 82 form a battery release mechanism. Generally speaking, the release button 80 is operatively coupled to the battery engaging member 44 to move the hook 44a to a battery release position when the release button 80 is moved from a rest position to a depressed position. Thus, when the release button 80 is depressed against the urging force of the return spring 82, the hook 44a is moved laterally to the battery release position.

More specifically, the release button 80 is movably mounted in an opening 40b of the battery holder body 40 such that the release button 80 straddles the battery engaging member 44. The return spring 82 is disposed between the battery holder body 40 and the battery engaging member 44 to bias the battery engaging member 44 against an inner end of the release button 80. In other words, the return spring 82 holds the battery engaging member 44 and the release button 80 in their rest positions such that the battery engaging member 44 is located along the center plane of the battery holder body 40 and the release button 80 protrudes out of the battery holder body 40. To release the battery from the battery engaging member 44, the release button 80 is pushed inward towards the battery holder body 40 against an urging force of the return spring 82. This movement of the release button 80 towards the battery holder body 40 causes the battery engaging member 44 to move in a direction transverse to the first and second movement directions D1 and D2. As a result, the battery engaging member 44 is released from the latch portion 12a of the battery 12.

In the illustrated embodiment, the lever portion 70 includes a release button receiving recess 70a for receiving the exposed outer portion of the release button 80 while the operating member 42 is in the second position. When the operating member 42 is in the second position (see FIGS. 16 and 17), the lever portion 70 covers the release button 80 such that the release button 80 is inaccessible.

Now the installation of the battery 12 to the bicycle battery holder 16 will be discussed in more detail with reference to FIGS. 8 to 17. FIG. 8 illustrates a portion of the battery 12 in a position just prior to attachment of the battery 12 to the bicycle battery holder 12. With the operating member 42 in the first position as seen in FIG. 8, the operating member 42 holds the battery engaging member 44 at a first battery retaining location with respect to the battery holder body 40 such that the battery 12 can be initially installed on the battery holder body 40 by moving the battery 12 on the mounting rail 30 in the first direction D1. As seen in FIG. 9, when the battery 12 is inserted in to the battery receiving recess 58 of the battery holder body 40, the latch portion 12a of the battery 12 initially contacts the hook 44a of the battery engaging member 44 to move the hook 44a laterally to the battery release position against the urging force of the return spring 82. Thus, the battery engaging member 44 is moved in the transverse direction against the force of the return spring 82 during initial insertion of the battery 12 into the battery holder body 40.

Figure 10:
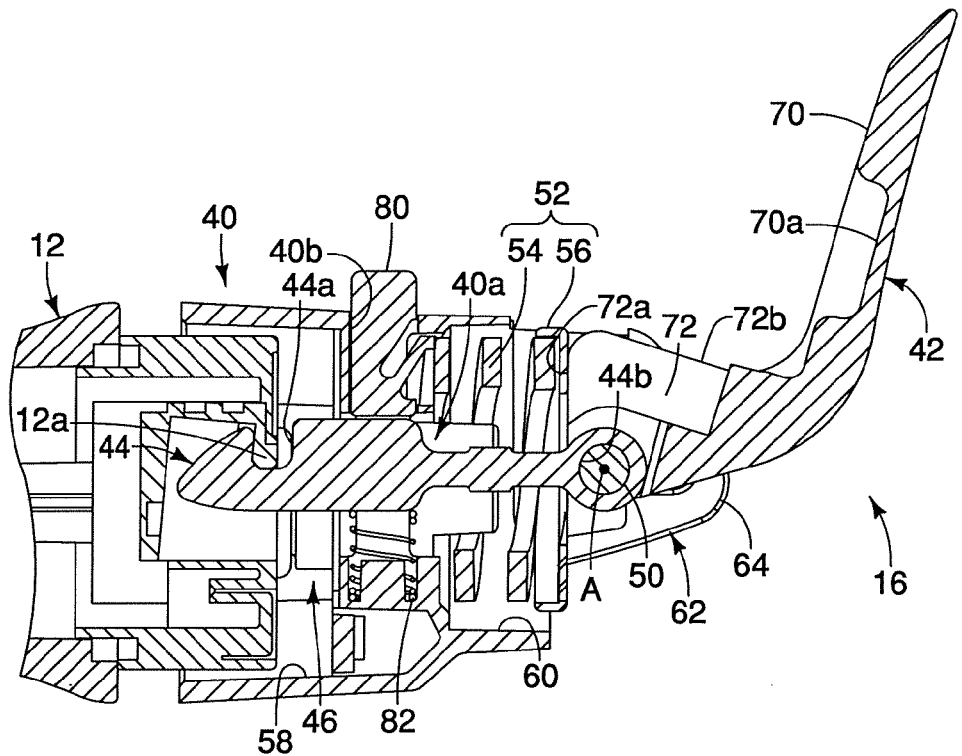
FIG. 10 is a cross sectional view, similar to FIGS. 8 and 9, of the bicycle battery holder and a portion of the battery, but showing the battery moved further into the bicycle battery holder to the first battery retaining location (non-fully seated position) such that the battery engaging member of the bicycle battery holder engages the battery to partially retain the battery thereto.

Then, as seen in FIG. 10, the hook 44a of the battery engaging member 44 moves laterally back to the rest position for retaining the battery 12 to the battery holder body 40 in a first battery retaining location. Once the battery 12 reaches the first battery retaining location, the battery engaging member 44 is urged back to its rest position by the force of the return spring 82 such that the hook 44a engaged the latch portion 12a of the battery 12. In other words, the hook 44a of the battery engaging member 44 engage the latch portion of the battery 12 prior to the operating member 42 being moved to the second position.

Figure 11:
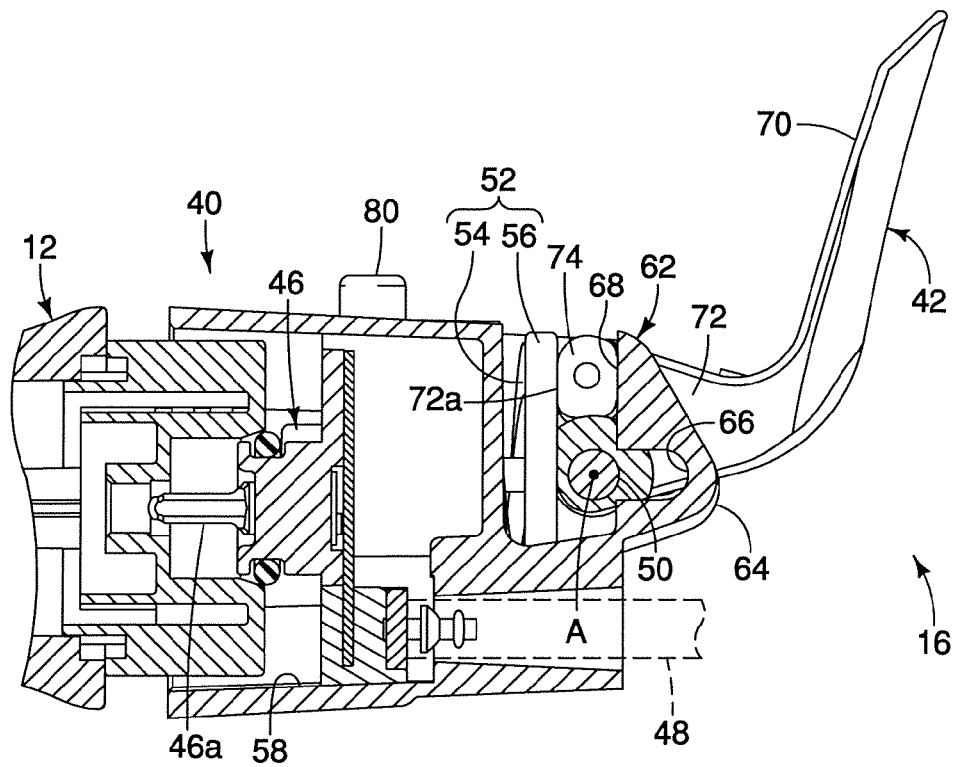
FIG. 11 is a cross sectional view, similar to FIG. 6, of the bicycle battery holder, but also showing a portion of the battery in the first battery retaining location (non-fully seated position) similar to FIG. 10 such that the battery engaging member of the bicycle battery holder engages the battery to partially retain the battery thereto.
Figure 12:
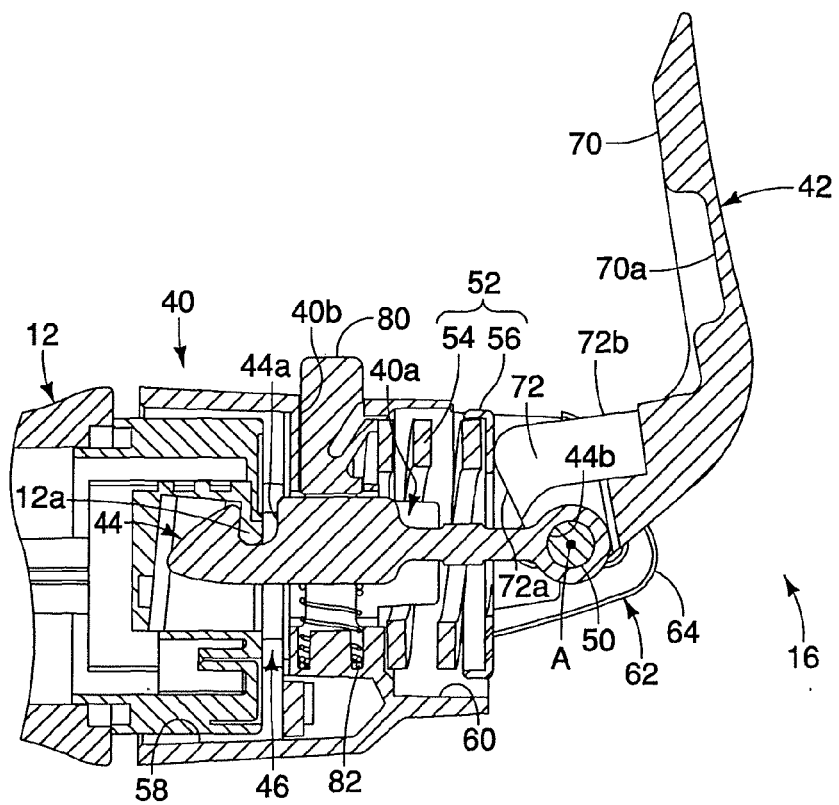
FIG. 12 is a cross sectional view, similar to FIGS. 8 to 10, of the bicycle battery holder and the portion of the battery, but showing the battery moved further into the bicycle battery holder from the position in FIGS. 10 and 11.
Figure 13:
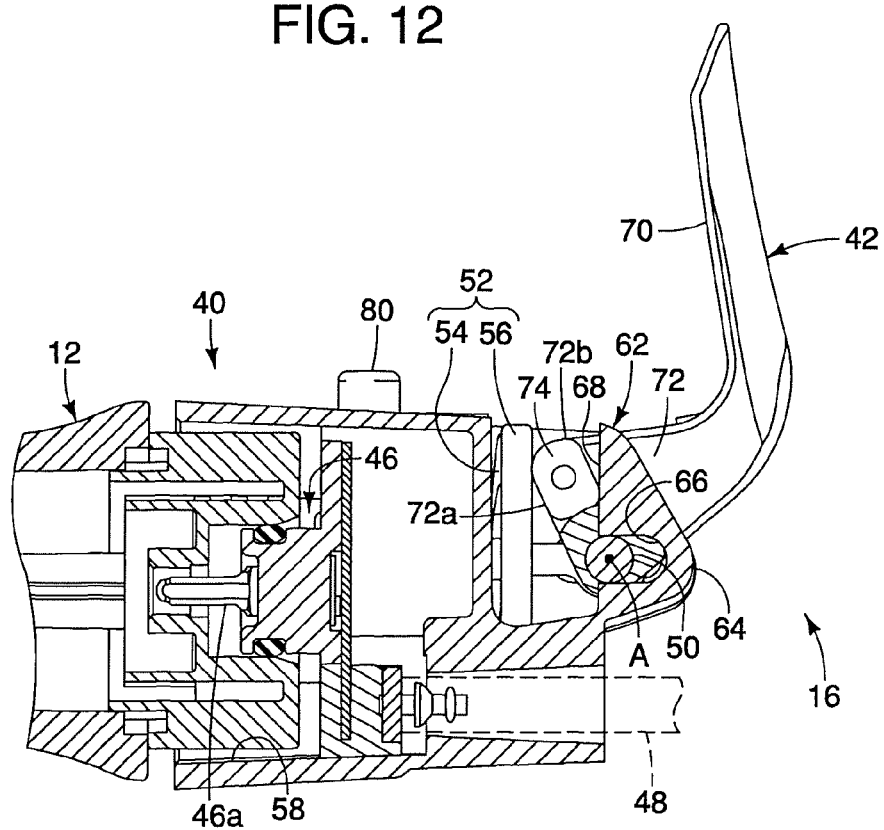
FIG. 13 is a cross sectional view, similar to FIG. 11, of the bicycle battery holder and the portion of the battery, but showing the battery in the position similar to FIG. 12.
Figure 14:
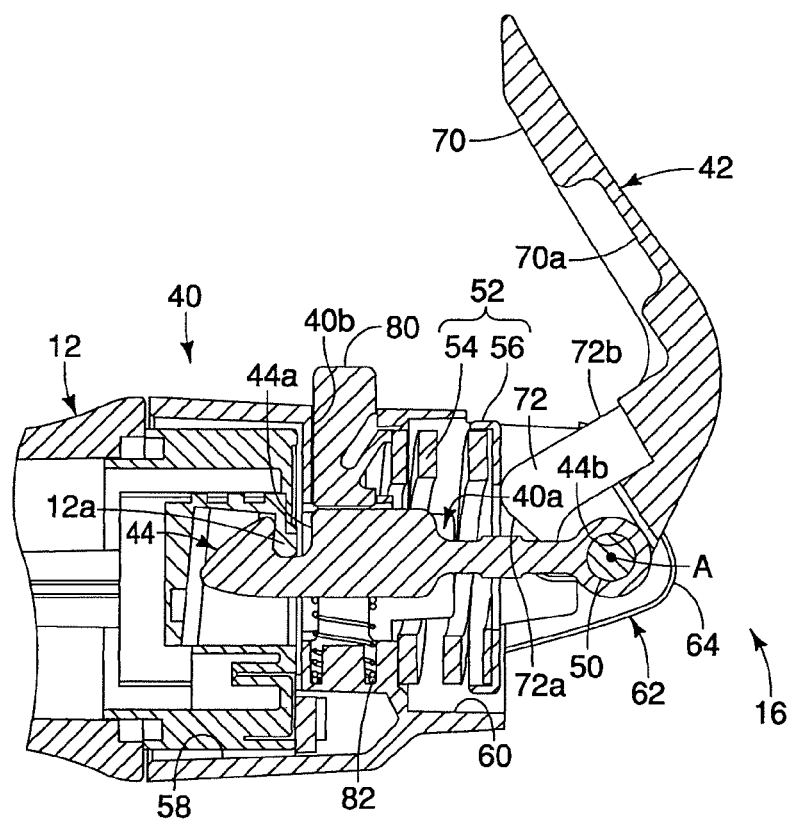
FIG. 14 is a cross sectional view, similar to FIGS. 8 to 10 and 12, of the bicycle battery holder and the portion of the battery, but showing the battery moved further into the bicycle battery holder from the position in FIGS. 12 and 13.
Figure 15:
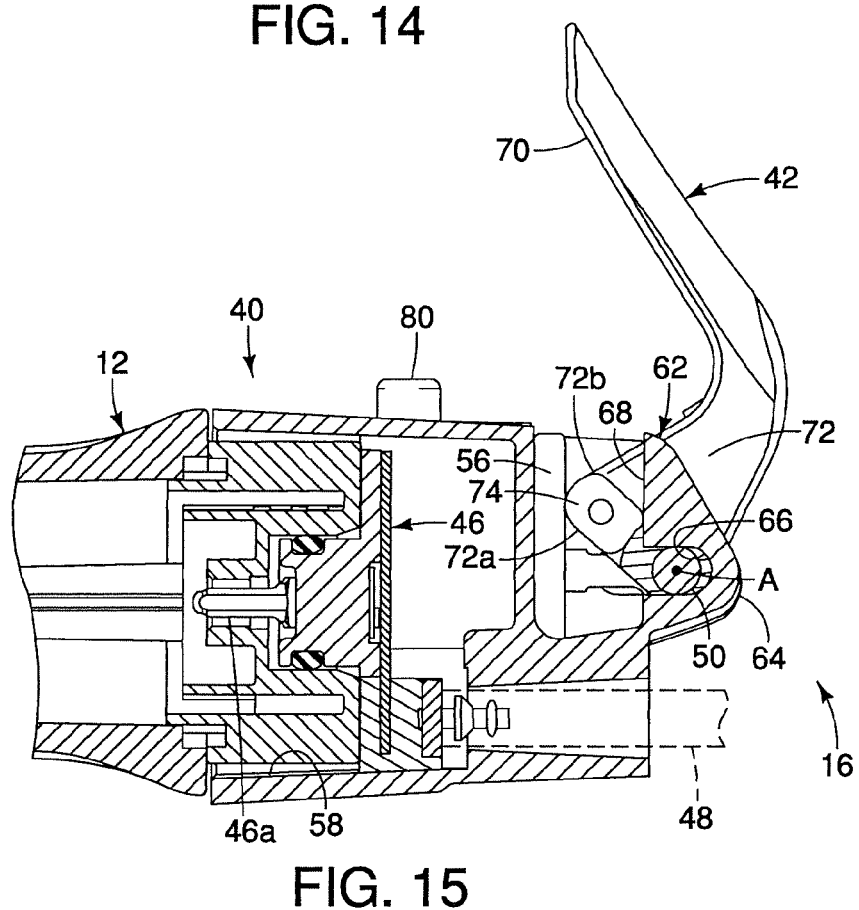
FIG. 15 is a cross sectional view, similar to FIG. 13, of the bicycle battery holder and the portion of the battery, but showing the battery in the position similar to FIG. 14.

When the hook 44a of the battery engaging member 44 engages the latch portion 12a of the battery 12, the battery 12 is held at the first battery retaining location on the battery holder body 40 and cannot be removed until the release button 80 is depressed. As seen in FIG. 11, while the battery 12 coupled to the battery holder body 40 in the first battery retaining location, the electrical terminals of the electrical connector 46 are not fully engaged with the electrical terminals (not shown) of the battery 12. Thus, with this arrangement of the illustrated embodiment, the battery engaging member 44 is arranged with respect to the battery holder body 40 to be automatically moved in the transverse direction with respect to the first direction D1 in response to movement of the battery 12 in the first direction D1 to the first battery retaining location.

Now with the battery 12 retained on the battery holder body 40 in the first battery retaining location, the operating member 42 can be rotated to the second position. Rotation of the operating member 42 to the second position causes the battery engaging member 44 is move in the first direction D1 from the first battery retaining location to a second battery retaining location in which a tight coupling between the battery 12 and the battery holder body 40 is obtained.

Figure 18:
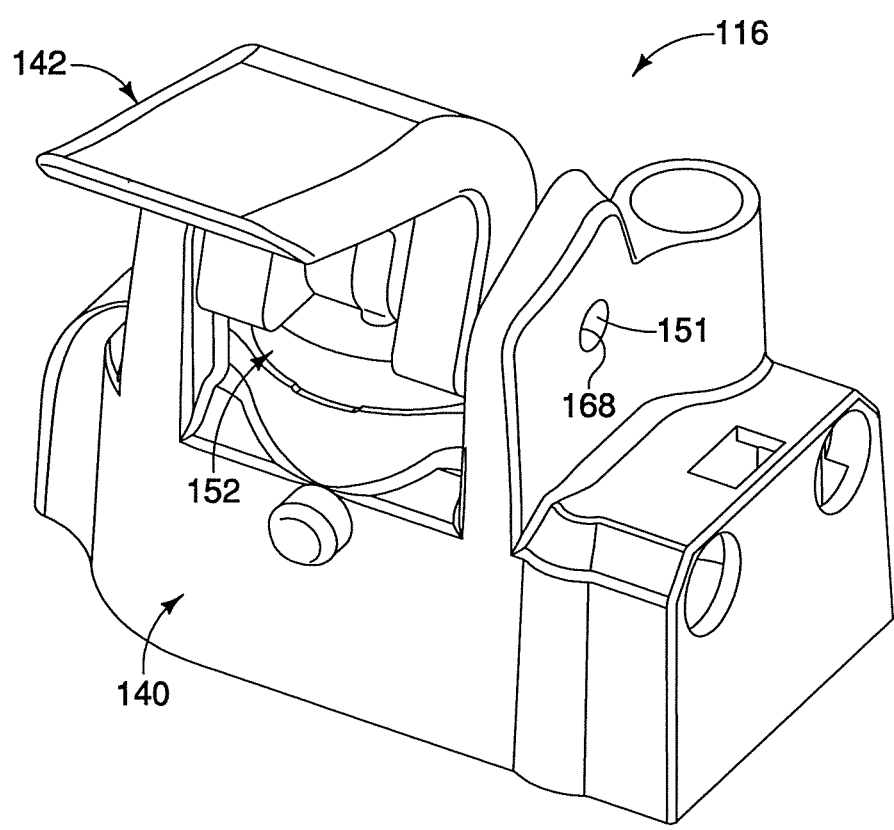
FIG. 18 is a perspective view of the bicycle battery holder in accordance with a second embodiment.
Figure 19:
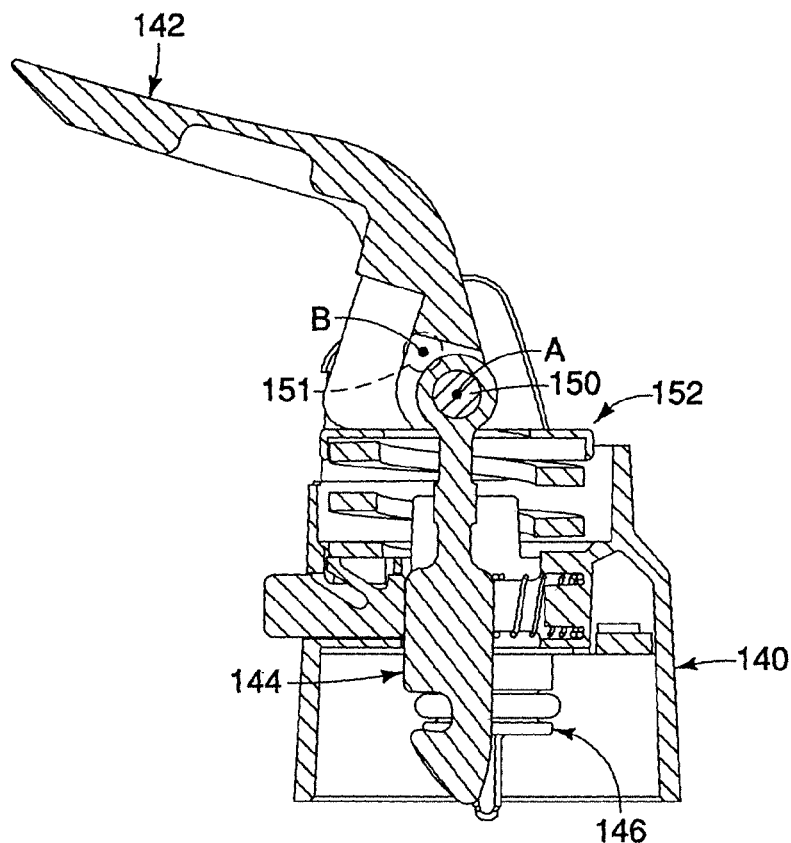
FIG. 19 is a cross sectional view of the bicycle battery holder illustrated in FIG. 18, with the operating member in the first position.
Figure 20:
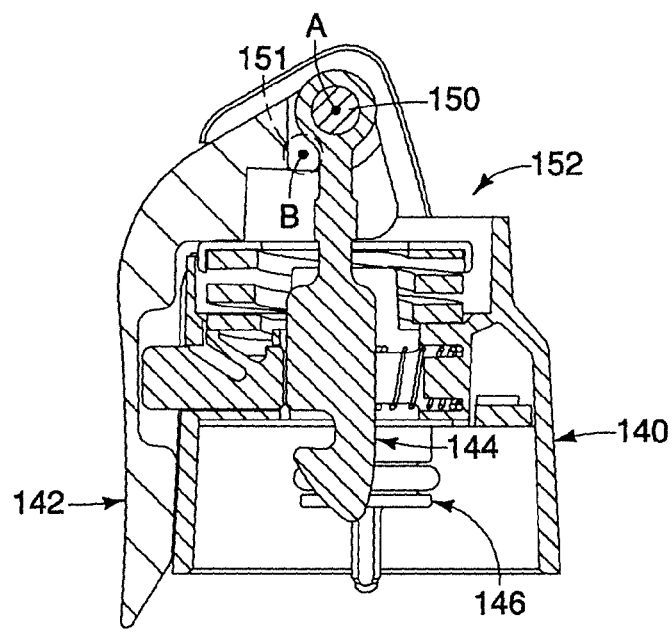
FIG. 20 is a cross sectional view, of the bicycle battery holder illustrated in FIGS. 18 and 19, but with the operating member in the second position.

Referring now to FIGS. 18 to 20, a bicycle battery holder 116 is illustrated in accordance with a second embodiment. The bicycle battery holder 116 is configured to be used with the battery 12 of the first embodiment. Basically, the bicycle battery holder 116 includes a battery holder body 140, an operating member 142 and a battery engaging member 144. The battery holder body 140 is provided with an electrical connector 146 that is configured to mate with electrical terminal or contacts (not shown) of the battery 12 for receiving electricity from the battery 12. In the second embodiment, the battery engaging member 144 is pivotally mounted to the operating member 142 by an axle 150, and the operating member 142 is pivotally mounted to the battery holder body 140 by an axle 151 (i.e., two separate pivot pins). The bicycle battery holder 116 further includes a biasing member 152 that is disposed between the battery holder body 140 and the operating member 142.

Basically, the battery engaging member 144, the electrical connector 146 and the biasing member 152 are identical to the battery engaging member 44, the electrical connector 46 and the biasing member 52 of the first embodiment, respectively. The only difference between the bicycle battery holder 16 and the bicycle battery holder 116 is that (1) the battery engaging member 144 is pivotally attached to the operating member 142 by the axle 150, and (2) the operating member 142 is pivotally attached to the battery holder body 140 by the axle 151 (i.e., two separate pivot pins). Thus, the axle 150 has a pivot axis A that is offset from a pivot axis B of the axle 151 in this second embodiment. As a result of these two changes in the second embodiment, the pivot axis A will shift laterally with respect to the movement direction of the battery engaging member 144 as the operating member 142 pivots from the first position to the second position. Also as a result of these two changes in the second embodiment, the functions of the projections 74 of the first embodiment are now performed by the axle 151. In other words, the axle 151 has two pins located in holes 168 (only one shown in FIG. 18) such that the axle in the contacts the battery holder body 140 to limit rotational movement of the operating member around the axis A of the axle 150 to maintain the operating member 142 in the first position while the operating member 142 is disposed in the first position The operation of the bicycle battery holder 116 is identical to the bicycle battery holder 16, except the that the operating member 142 pivots on the battery holder body 140 by the axle 151 with the battery engaging member 144 being moved via the axle 150. Thus, for the sake of brevity, the bicycle battery holder 116 will not be discussed in detail. Rather, it will be apparent to those skilled in the art that the descriptions of the parts and operations of the bicycle battery holder 16 apply to the bicycle battery holder 116 in this second embodiment, except the differences mentioned above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle battery holder comprising:
a battery holder body including a battery receiving portion that is configured to receive a battery and a contact portion that is stationary with respect to the battery receiving portion;
an operating member pivotally mounted to the battery holder body on an axle between a first position and a second position, the operating member including at least one protrusion that is offset from the axle and extends in a direction parallel to an axial direction of the axle; and
a battery engaging member pivotally coupled to the operating member on the axle such that the battery engaging member moves in a first direction with respect to the battery holder body to a battery retaining position as the operating member moves from the first position to the second position, the axle defining as an axis that is a center of pivoting of both the operating member and the battery engaging member as the operating member pivots between the first and the second position,
the contact portion of the battery holder body comprising at least one slot in which the at least one protrusion is disposed, the at least one slot including a surface arranged to contact the at least one protrusion of the operating member such that rotational movement of the operating member around the axis of the axle is limited and the operating member is maintained in the first position while the operating member is disposed in the first position.

2. The bicycle battery holder according to claim 1, wherein the contact portion of the battery holder body limits movement of the operating member in the first direction while the operating member is disposed in the first position.

3. The bicycle battery holder according to claim 1, further comprising
a biasing member disposed between the battery holder body and the operating member such that the biasing member biases the at least one protrusion of the operating member towards the contact portion while the operating member is disposed in the first position.

4. The bicycle battery holder according to claim 3, wherein the biasing member further includes a compression spring and a spring holder, the spring holder being disposed on the compression spring such that spring holder contacts the operating member.

5. The bicycle battery holder according to claim 3, wherein the at least one protrusion of the operating member restricts movement of the operating member in the first direction by the at least one protrusion contacting the at least one surface of the contact portion of the battery holder body.

6. The bicycle battery holder according to claim 5, wherein the at least one protrusion is spaced from the axis of the axle in a second direction that is opposite to the first direction while the operating member is in the second position.

7. The bicycle battery holder according to claim 5, wherein the at least one protrusion is a pair of protrusions, the protrusions projecting in opposite directions, and
the at least one slot is a pair of slots, one of the protrusions being disposed in each of the slots.

8. The bicycle battery holder according to claim 5, wherein the battery engaging member is movably mounted with respect to the battery holder body to move in a transverse direction with respect to the first direction.

9. The bicycle battery holder according to claim 1, wherein the contact portion limits movement of the operating member in the first direction while the operating member is disposed in the second position.

10. The bicycle battery holder according to claim 1, further comprising
a biasing member disposed between the battery holder body and the operating member such that the biasing member biases the operating member to remain in the first position while the operating member is disposed in the first position.

11. The bicycle battery holder according to claim 10, wherein
the biasing member biases the operating member to remain in the second position while the operating member is disposed in the second position.

12. The bicycle battery holder according to claim 11, wherein
the at least one protrusion of the operating member includes a first contact surface which contacts the biasing member while the operating member is disposed in the first position, and a second contact surface which contacts the biasing member while the operating member is disposed in the second position.

13. The bicycle battery holder according to claim 12, wherein
the first contact surface of the at least one protrusion is spaced from the axis of the axle by a first distance, and
the second contact surface of the at least one protrusion is spaced from the axis of the axle by a second distance, the second distance being larger than the first distance.

14. The bicycle battery holder according to claim 12, wherein
the biasing member includes a compression spring, the compression spring having a first end pushing against the battery holder body and a second end selectively pushing against the first and second contact surfaces of the at least one protrusion.

15. The bicycle battery holder according to claim 14, wherein
the first and second contact surfaces of the at least one protrusion form a cam portion of the operating member, and
the compression spring is arranged between the battery holder body and the cam portion of the operating member such that the compression spring compresses and the battery engaging member moves in the first direction as the operating member moves from the first position to the second position.

16. The bicycle battery holder according to claim 1, wherein
the battery engaging member includes a hook that is arranged with respect to the battery holder body to engage a latch portion of a battery.

17. The bicycle battery holder according to claim 16, wherein
the hook is further arranged with respect to the operating member such that the hook engages the latch portion of the battery prior to the operating member being moved to the second position.

18. The bicycle battery holder according to claim 17, wherein
the battery holder body includes an electrical connector, the hook of the battery engaging member being disposed on a first side of the electrical connector and the battery engaging member being coupled to the operating member on a second side of the electrical connector with respect to the first direction such that the hook of the battery engaging member moves toward the electrical connector as the operating member is moved from the first position to the second position.

\* \* \* \* \*